United States Patent

Brodt et al.

[11] Patent Number: 5,552,229
[45] Date of Patent: Sep. 3, 1996

[54] MAGNETIC RECORDING MEDIUM CONTAINING MAGNETIC MATERIAL DISPERSED IN A POLYURETHANEUREA-POLYURETHANE BINDER

[75] Inventors: Gregor Brodt, Heppenheim; Attila Vass, Munich; Werner Loch, Appenweier; August Lehner, Rödersheim-Gronau; Werner Lenz, Bad Dürkheim; Norbert Schneider, Altrip, all of Germany

[73] Assignee: BASF Magnetics GmbH, Mannheim, Germany

[21] Appl. No.: 314,956

[22] Filed: Sep. 29, 1994

[30] Foreign Application Priority Data

Sep. 30, 1993 [DE] Germany .......................... 43 33 292.7

[51] Int. Cl.⁶ ................................................. G11B 5/702
[52] U.S. Cl. ............................... 428/425.9; 428/694 BU; 428/694 BY; 428/900
[58] Field of Search ........................... 428/425.9, 694 BU, 428/694 BL, 900, 694 BY

[56] References Cited

U.S. PATENT DOCUMENTS

| | | | |
|---|---|---|---|
| 2,871,218 | 1/1959 | Schollenberger et al. | 525/440 |
| 2,899,411 | 8/1959 | Schollenberger et al. | 528/76 |
| 4,152,485 | 5/1979 | Mizumura et al. | 428/423.7 |
| 4,567,108 | 1/1986 | Lehner et al. | 428/425.9 |
| 4,567,109 | 1/1986 | Lehner et al. | 428/425.9 |
| 4,568,610 | 2/1986 | Lehner et al. | 428/425.9 |
| 4,666,781 | 5/1987 | Lehner et al. | 428/425.9 |
| 4,948,859 | 8/1990 | Echols et al. | 528/28 |
| 5,130,202 | 7/1992 | Keppeler et al. | 428/425.9 |
| 5,266,408 | 11/1993 | Kepdeler et al. | 428/425.9 |
| 5,281,482 | 1/1994 | Martens | 428/425.9 |

FOREIGN PATENT DOCUMENTS

| | | |
|---|---|---|
| 193084 | 9/1986 | European Pat. Off. . |
| 38 14 536 | 11/1988 | Germany . |

OTHER PUBLICATIONS

Chem. Abstract JP 57 092 422 Jun. 1982.
Chem. Abstract JP 57 092 421 Jun. 1982.
Cellulosechemie 13 (1932), 58 et seq., H. Fikentscher.

*Primary Examiner*—Stevan A. Resan
*Attorney, Agent, or Firm*—Keil & Weinkauf

[57] ABSTRACT

In magnetic recording media consisting of a nonmagnetic substrate and at least one magnetizable layer firmly applied thereon and based on magnetic material dispersed in a binder mixture which contains at least one hydroxyl-containing, preferably low molecular weight polyureaurethane and one polyurethaneurea (meth)acrylate, the polyurethaneurea (meth)acrylate is obtained by reacting a poly-(meth)acrylate having up to 2 terminal OH groups per mol and a molecular weight of from 200 to 50,000 with a mixture of aliphatic polyisocyanates having an average functionality of from 3.0 to 6.0 NCO groups per mol, consisting of from 0.1 to 10% by weight of a diisocyanate, from 30 to 80% by weight of a triisocyanate and from 20 to 60% by weight of an isocyanate having a functionality of from 4 to 10, with the proviso that from 1.2 to 3.0 NCO groups react per OH group and the remaining NCO groups are converted into substituted terminal urea groups with a polyfunctional amine or with a mixture of different polyfunctional amines.

8 Claims, No Drawings

MAGNETIC RECORDING MEDIUM CONTAINING MAGNETIC MATERIAL DISPERSED IN A POLYURETHANEUREA-POLYURETHANE BINDER

The invention relates to magnetic recording media consisting of a nonmagnetic substrate and at least one magnetized layer applied firmly thereon and based on a magnetic material dispersed in at least one polyurthaneurea (meth-)acrylate and a polyurethane.

Higher and higher requirements are being set for magnetic recording media with regard to recording, playback and aging resistance. The binder is becoming increasingly important for meeting these requirements.

Thus, for improving the magnetic properties, in particular the residual induction, a high packing density of the magnetic material in the layer is desirable, resulting in a reduction in the amount of binder in the layer. Attempts have also been made to obtain an improved signal/noise ratio and a very narrow field strength distribution by using increasingly finely divided magnetic materials having a pronounced and extremely uniform acicular shape. These materials are furthermore very often surface-modified to reduce aging phenomena. Owing to such measures, both the dispersing of the pigments in the dispersing process and the achievement of good dispersion stability are considerably more difficult. Moreover, the magnetic layers must be very flexible, must have high resilience and must possess high tensile strength. Furthermore, in order to avoid drops in output level, a reduction in the coefficients of friction, and an increase in the abrasion resistance and wear resistance are increasingly being required. Moreover, this mechanical stability of the magnetic layer must also be ensured at high temperature and high humidity.

It is known that magnetic layers which are subjected to severe mechanical stresses contain polyurethane elastomers which prove to be advantageous binders. Polyesterurethanes as described in DE-B 1 106 959, DE-B 2 753 694, EP-A 0 069 955 or U.S. Pat. No. 2 899 411 have proven particularly useful.

However, these binders can no longer adequately fulfill all the requirements and measures described above. In many cases, the pigment wetting and dispersing, particularly in the case of the very finely divided materials, are adversely affected, so that any sintered materials are insufficiently divided up during the milling process or agglomeration of the pigment particles is not adequately prevented, resulting in poor magnetic properties and consequently poor tape properties in terms of electroacoustic and video data. Relatively small amounts of low molecular weight dispersants are therefore added to facilitate the dispersing process. However, these dispersants have disadvantages. Thus, low molecular weight dispersants may be readily exuded under unfavorable climatic conditions, such as high temperature and/or high humidity. This leads to deposits on all parts in contact with the tape, in particular on the head, in recording and playback apparatuses, causing drops in output levels. Moreover, the friction (adhesion) increases considerably, which may result in the tape coming to a stop, ie. blocking. The use of dispersing resins may on the other hand lead to compatibility problems in the dispersion. Since these dispersants contain polar groups, the hydrophilic character of the layer increases considerably and thus, especially under conditions of high humidity, also effects such a swelling of the layer, exudation of the dispersants and lubricants and changes in mechanical properties due to changes of the plasticizer effects.

Incorporating polar groups into the binder was proposed at an early stage for improving the dispersing properties of polyurethane binders. These polar groups can in principle be introduced via any component which is used in the preparation of the polyurethane. Polyesters having polar groups are most frequently used (DE-A 28 33 845, etc.). The incorporation of diols which additionally carry polar groups is described in, for example,, JP-A 57 092 421, German Laid-open Application DOS 3,814,536 or EP-A 193 084. The subsequent incorporation of the polar groups by an SN reaction at the terminal OH groups of the polyurethanes is disclosed in JP-A 57 092 422. These dispersing resins result in very good division of the pigments on the one hand but on the other hand, especially with increasing fineness of the magnetic pigments used, lead to dispersions having extremely disadvantageous rheological properties, such as a high flow limit and high viscosity, so that the further processing of these dispersions to magnetic layers is very difficult. Furthermore, the content of ionic groups having dispersant activity in the dispersing resin is limited to a maximum concentration, since otherwise adverse effects, such as flocculation through bridging, occur. An increase in the pigment concentration on the one hand and a reduction in the particle size on the other hand are no longer compatible with the content of dispersing resin then required.

It was possible to achieve a substantial improvement in the dispersing behavior with low molecular weight, OH-containing polyurethanes, as described in European Patent 0 099 533. However, these measures too are insufficient for dispersing the increasingly finely divided pigments and for meeting the constantly increasing requirements with regard to the mechanical and magnetic properties of the magnetic recording media.

According to European Patent 0 099 533, it has proven advantageous subsequently to cure OH-containing polyurethanes by means of polyfunctional isocyanates or isocyanate polymers in order to improve the mechanical properties of the magnetic recording layer. Owing to the low reaction rate between hydroxyl and isocyanate functions, this measure is insufficient for ensuring good curing of the magnetic layer at the high coating speeds prior to winding.

It is an object of the present invention to provide magnetic recording media whose magnetic layer contains a binder based on a polyurethaneurea polymer, preferably an OH-containing polyurethaneurea polymer, lubricants and finely divided magnetic material and, as a result of the addition of a further binder, has improved wear resistance, in particular under conditions of high temperature and humidity, increased residual induction, a narrow field strength distribution and a layer surface having few defects. Magnetic layers having few defects and good running properties require binder systems which ensure a very stable magnetic dispersion in addition to the high packing density of the magnetic material, the high residual induction and the narrow field strength distribution.

We have found that this object is achieved by magnetic recording media consisting of a nonmagnetic substrate and at least one magnetizable layer firmly applied thereon and based on a magnetic material dispersed in a binder mixture comprising at least one polyureaurethane and one polyurethaneurea (meth)acrylate, if the polyurethaneurea (meth-)acrylate is obtained by reacting a poly(meth)acrylate having up to 2 terminal OH groups per mol and a molecular weight of from 200 to 50,000, in particular from 1000 to 10,000, with a mixture of aliphatic polyisocyanates having an average functionality of from 3.0 to 6, preferably from 3.5 to 5, NCO groups per mol, consisting of from 0.1 to 10, preferably from 0.3 to 8, % by weight of a diisocyanate, from 30 to 80, preferably from 42 to 70, % by weight of a trisocynate, and from 20 to 60, preferably from 22 to 50, % by weight of an isocyanate having a functionality of from 4 to 10, with the proviso that from 1.2 to 3.0, preferably from 1.5 to 2.5, NCO groups react per OH group and the residual NCO groups are converted into urea groups with a polyfunctional amine or with a mixture of different polyfunctional amines.

The polyfunctional amines used are in particular aliphatic amines having at least 3 amino functions, preferably having at least two primary amino groups, and a nitrogen content of from 22 to 56, preferably from 30 to 40, % by weight.

For example, polyfunctional alkylamines, such as homologs of diethylamine, eg. diethylenetriamine or triethylenetetramine, mixtures of low molecular weight polyethyleneamines which are prepared by reaction of ethyleneimines and are sold under the name Polymin® and Lugalvan® by BASF AG, and diaminopropylenediamine, have proven particularly suitable.

The poly(meth)acrylate used for the preparation of the polyurethaneurea (meth)acrylate is an esterification product of (meth)acrylic acid and an alcohol component having a $C_{1-C25}$-alkyl radical and from 0 to 2.5% of a hydroxyalkyl (meth)acrylate having a $C_1$–$C_{25}$-alkylene radical. Examples of suitable alkyl radicals are methyl, ethyl, propyl, butyl, isopropyl, tert-butyl, pentyl, nonyl and stearyl. Suitable hydroxyalkyl (meth)acrylates include ethanediol monoacrylate, propanediol monoacrylate and butanediol monoacrylate.

In the polymerization, it is also advantageous to introduce the OH groups at the chain ends via OH-containing polymerization initiators, for example hydroxy peroxides, or OH-containing regulators, for example hydroxyl-containing mercaptans, in particular mercaptoethanol.

In the preparation of the poly(meth)acrylate, it is also possible to incorporate other known vinylmonomers, for example vinylbenzene, vinyl chloride, vinyl acetate, vinyl propionate, acrylamide, acrylonitrile or styrene.

Particularly suitable isocyanates are aliphatic isocyanates and their higher molecular weight polyisocyanate reaction products, as formed by an addition reaction of di-, tri- and possibly polyols with aliphatic diisocyanates, or by biuret or isocyanurate formation. Suitable aliphatic diisocyanates for this purpose are, for example, hexamethylene diisocyanate or isophorone diisocyanate.

The novel polyurethaneurea (meth)acrylates which are composed of the building blocks described have a broad molecular weight distribution for good dispersing behavior and high dispersion stability. The molecular weight is from 200 to 50,000, in general from 500 to 40,000 (measured by GPC), with a weight average molecular weight of from 1000 to 10,000, in particular from 2000 to 8000, preferably from 4000 to 7000.

If polyurethaneurea (meth)acrylates which consist of more than 90% of di- and triisocyanates are used, unstable dispersions which lead to defective tapes are obtained. When predominantly trifunctional isocyanates are used, the pigment dispersing is too slow or insufficient and the viscosity of the dispersions increases. This then leads to a very high solvent content of the dispersion.

The polyurethaneurea (meth)acrylate prepared according to the invention has a pendulum hardness (according to DIN 53 157) of from 20 to 130 s, particularly advantageously from 25 to 125 s.

The polyurethane (component 2) preferably contained, in addition to the polyurethaneurea (meth)acrylate (component 1), in the binder mixture forming in the magnetic layer of the novel magnetic recording medium is described, for example, in EP-A 414 111. However, a low molecular weight, OH-containing polyureaurethane according to EP-B 99 533 is particularly preferred. It is obtained by reacting a polydiol, a diol and a primary or secondary amino alcohol and, if required, a triol with a diisocyanate. These products have hydroxyl numbers of from 5 to 120 mg KOH/g and molecular weights of from 3000 to 150,000, measured by GPC. Those having hydroxyl numbers of from 25 to 70 mg KOH/g and molecular weights of from 3000 to 15,000 are preferably used, since products having higher molecular weights are difficult to process owing to their high viscosity.

The molar ratio of the polyurethaneurea (meth)acrylate reacted with polyfunctional amines to the polyureaurethane is in particular from 0.05 to 1.

The mixture forming the binder matrix of the magnetic layer of the novel magnetic recording media and comprising low molecular weight OH-containing polyureaurethane and polyurethaneurea (meth)acrylate contains the last-mentioned component preferably in an amount of not more than 30, in particular not more than 15, % by weight. For specific intended uses, it may be advantageous to add a further binder component in amounts of from 5 to 50, in particular from 10 to 30, % by weight, based on the resulting total amount of binder.

These physically drying binders which may additionally be present in the binder mixture are known. They include a polyvinyl formal binder which was prepared by hydrolysis of a polymer of a vinyl ester and subsequent reaction of the vinyl alcohol polymer with formaldehyde. The polyvinyl formals advantageously contain at least 65, in particular at least 80, % by weight of vinyl formal groups. Suitable polyvinyl formals contain from 5 to 13% by weight of vinyl alcohol groups and from 80 to 88% by weight of vinyl formal groups and have a density of about 1.2 and a viscosity of from 50 to 120 mPas, measured at 20° C. using a solution of 5 g of polyvinyl formal in 100 ml of 1:1 phenol/toluene. In addition to the polyvinyl formal, vinyl chloride/diol mono- or di(meth)acrylate copolymers which can be prepared, for example, in a conventional manner by solution copolymerization or suspension copolymerization of vinyl chloride and the diol monomethacrylate or monoacrylate are also suitable. The diol monoacrylate, diacrylate, monomethacrylate or dimethacrylate used for this purpose is an esterification product of acrylic acid or methacrylic acid with a corresponding molar amount of aliphatic diol of 2 to 4 carbon atoms, such as ethylene glycol, 1,4-butanediol and preferably propanediol, the last-mentioned compound preferably consisting of 1,3-propanediol and from 0 to 50% by weight of 1,2-propanediol. The copolymers advantageously contain from 50 to 95% by weight of vinyl chloride and from 5 to 50% by weight of a diol acrylate or methacrylate. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/propanediol monoacrylate copolymers, in a mixture of equal parts by volume of tetrahydrofuran and dioxane has a viscosity of about 30 mPas at 25° C. The K value according to H Fikentscher (Cellulosechemie 13 (1932), 58 et seq.) of the particularly suitable products is from 30 to 50, preferably about 40.

Phenoxy resins whose constitution is described by the recurring formula

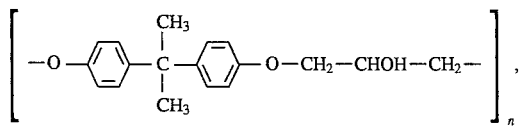

where n is roughly 100, may also advantageously be used. These are polymers such as those known under the trade names Epikote® from Shell Chemical Co. or under the name epoxy resin PKHH® from Union Carbide Corporation.

Cellulose ester binders are also suitable for use in the binder mixture defined. These are esterification products of cellulose with nitric acid or with carboxylic acids of 1 to 4 carbon atoms, eg. cellulose acetate, cellulose triacetate, cellulose acetopropionate or cellulose acetobutyrate.

The advantageous properties of the magnetic recording media having the composition according to the invention compared with the magnetic recording media obtained using the conventional thermoplastic polyurethane elastomers are also evident when a polyisocyanate is added before the application of the dispersion to the substrate. A large number of organic di-, tri- or polyisocyanate or isocyanate prepolymers having a weight average molecular weight of up to 10,000, preferably from 500 to 3000, determined by GPC, may be used for crosslinking. Polyisocyanates or isocyanate prepolymers which carry more than two NCO groups per molecule are preferred. Polyisocyanates based on toluylene diisocyanate, hexamethylene diisocyanate or isophorone diisocyanate, which are formed by a polyaddition reaction with di- or triols or by biuret and isocyanurate formation, have proven particularly useful. An adduct of toluylene diisocyanate with trimethylolpropane and diethylene glycol is particularly advantageous. Depending on the requirements set for the recording material, the amount of polyisocyanate component added may be up to 70%, preferably up to 50%, less than the stoichiometric amount of up to 100%, preferably up to 50%, more than said amount, based on the OH groups of the binders to be crosslinked.

The further processing of the binder mixture with magnetic materials and assistants to give the novel magnetic recording media is carried out in a manner known per se.

The conventional pigments which substantially influence the properties of the resulting magnetic layer, for example gamma-iron (III) oxide, finely divided magnetite, ferromagnetic undoped or doped chromium dioxide, cobalt-modified gamma-iron(III) oxide, barium ferrites or ferromagnetic metal particles, may be used as anisotropic magnetic materials. Acicular cobalt-modified or unmodified gamma-iron(III) oxide and ferromagnetic chromium dioxide and metal pigments are preferred. The particle size is in general from 0.2 to 2 µm, preferably from 0.2 to 0.8 µm. Chromium dioxide, mixtures of chromium dioxide with up to 60% by weight of cobalt-doped iron oxide or pure cobalt-doped iron oxide are particularly preferred.

The magnetic layers may furthermore contain conventional additives, such as lubricants and, in minor amounts which are small when compared with the prior art, ie. not more than 2% by weight, based on the dispersion, dispersants, as well as fillers, which are mixed in during the dispersing of the magnetic pigments or during the production of the magnetic layer.

The ratio of magnetic material to binder in the novel recording materials is from 1 to 10, in particular from 3 to 6, parts by weight of magnetic material to one part by weight of the binder mixture. The fact that, owing to the excellent pigment binding capacity of the special binder mixture, high concentrations of magnetic material in the magnetic layers are possible without the mechanical-elastic properties being adversely affected or the performance characteristics markedly suffering is a particular advantage.

The dispersions prepared using the novel polyurethaneurea (meth)acrylates have excellent stability compared with known products.

The dispersion stability was measured as follows: glass bottles having a capacity of 100, 150 or 250 ml were filled about ⅔ with the dispersion to be investigated and were closed and then placed on a roller stand. After 24 hours, the bottles were opened again and in each case a manual coating was produced with a manual knife coater on a very smooth 75 µm thick polyethylene terephthalate film having an average peak-to-valley height of from 40 to 50 nm. The gloss values of these were determined with the aid of a gloss meter and were compared with the values of the freshly prepared dispersion, which was also subjected to a manual coating test prior to storage on the roller stand. In the case of the novel stable dispersions, no or only slight deviations from the initial values were found; the prior art dispersions showed deviations, some of which were considerable.

The nonmagnetic and nonmagnetizable substrates used are the conventional rigid or flexible substrates, in particular films of linear polyesters, such as polyethylene terephthalate, in general in thicknesses of from 4 to 200 µm, in particular from 6 to 36 µm. Recently, the use of magnetic layers on paper substrates for electronic computing and accounting machines has also become important; the novel coating materials may advantageously be used for this purpose too.

The novel magnetic recording media can be produced in a known manner. Advantageously, the magnetic pigment dispersion prepared in a dispersing apparatus, for example a tubular ball mill or a stirred ball mill, from the magnetic material and a solution of the binders with the addition of lubricants and possibly small amounts of dispersants is mixed with the polyisocyanate cross-linking agent and then filtered and applied with a conventional coating apparatus, for example by means of a knife coater, onto the nonmagnetic substrate. In order to obtain high acoustic and magnetic values in relatively short dispersing time, it is advantageous to carry out the dispersing with the novel polyurethaneurea (meth)acrylate and to stir in the remaining binder components after the dispersing step. This process is suitable because the stated component 2 is readily compatible with component 1. As a rule, magnetic orientation is carried out before the liquid coating mixture has dried on the substrate; the latter step is advantageously carried out in the course of from 10 to 200 s at from 50 to 90° C. The magnetic layers may be calendered and compacted on conventional apparatuses by being passed between heated and polished rollers, if necessary under pressure and at temperatures of from 25 to 100° C., preferably from 60° to 90° C. In the case of crosslinking binders, it has proven very advantageous to carry out the calendering before the crosslinking is complete, since the OH polymers in the uncrosslinked state are very thermoplastic without being tacky. The thickness of the magnetic layer is in general from 0.5 to 20 µm, preferably from 1 to 10 µm. In the case of the production of magnetic tapes, the coated films are slit in the longitudinal direction into the usual widths generally specified in inches.

Compared with the prior art magnetic recording media, the novel magnetic recording media have improved fine roughness of the surface of the magnetic layer, greater wear resistance, in particular under conditions of high temperature and humidity, and improved magnetic characteristics. As a result of these improved surfaces having fine roughness and better magnetic properties, the HF output level and the chroma output level in the video sector substantially increase, and the hifi output level is also considerably higher. A further consequence of these improved properties is a greater signal/noise ratio, due to reduced noise, especially the modulation noise, which reduces the necessity of using even more finely divided magnetic pigments. However, the larger pigment needles can be more readily oriented with the same orientation effort and thus give higher residue inductions and output levels than magnetic pigments which are more finely divided. The technical complexity for dispersing, coating and orienting the magnetic layer can thus be reduced compared with the prior art, without having to dispense with the advantages of the high recording density. Owing to the reduction in the dispersing cost and dispersing time and to the high solids content of the dispersion and the increased long-term stability of the dispersion, the novel magnetic recording media can be produced in a simple and economical manner.

In addition, by using the novel polyurethaneurea (meth)acrylates, the curing time of the magnetic layer can be substantially shortened and hence the coating speed considerably increased compared with the prior art. Moreover, the increased layer hardness reduces the tendency to the production of impressions in the roll.

EXAMPLES

Preparation of Polyurea (meth)acrylates

Example 1

(polymer A)

699.26 parts of tetrahydrofuran were heated to the boil in a heatable reaction vessel having a capacity of 4000 parts by volume and equipped with a stirrer and reflux condenser. A mixture of 636.12 parts of methyl methacrylate, 636.12 parts of n-butyl methacrylate, 26.4 parts of mercaptoethanol and 3.2 parts of azobisisobutyronitrile was metered in over 2 hours. Stirring was carried out for 30 minutes, after which a solution of 5.28 parts of azobisisobutyronitrile in 61.26 parts of tetrahydrofuran was added in the course of a further 2 hours. After 2 hours, a mixture of 135.34 parts of tetrahydrofuran, 1.07 parts of hexamethylene diisocyanate, 129.31 parts of a trifunctional biuret of hexamethylene diisocyanate and 63.57 parts of biurets of hexamethylene diisocyanate which have a higher functionality of, on average, 4.8 was added in the course of 15 minutes. Stirring was carried out for 30 minutes, after which 0.64 part of dibutyltin dilaurate was added. After 4 hours, 97.80 parts of diaminopropylethylenediamine and 604.14 parts of tetrahydrofuran were added. The Fikentscher K value of the polymer was about 23, measured in 1% strength solution in dimethylformamide.

Example 2

(polymer B)

699.26 parts of tetrahydrofuran were heated to the boil in a heatable reaction vessel having a capacity of 4000 parts by volume and equipped with a stirrer and reflux condenser. A mixture of 636.12 parts of methyl methacrylate, 636.12 parts of n-butyl methacrylate, 26.4 parts of mercaptoethanol and 3.2 parts of azobisisobutyronitrile was metered in over 2 hours. Stirring was carried out for 30 minutes, after which a solution of 5.28 parts of azobisisobutyronitrile in 61.26 parts of tetrahydrofuran was added in the course of a further 2 hours. After 2 hours, a mixture of 135.34 parts of tetrahydrofuran, 1.07 parts of hexamethylene diisocyanate, 129.31 parts of a trifunctional biuret of hexamethylene diisocyanate and 63.57 parts of biurets of hexamethylene diisocyanate which have a higher functionality of, on average, 4.8 was added in the course of 15 minutes. Stirring was carried out for 30 minutes, after which 0.64 part of dibutyltin dilaurate was added. After 4 hours, 86.8 parts of triethylenetetramine and 603.14 parts of tetrahydrofuran were added. The Fikentscher K value of the polymer was about 25, measured in 1% strength solution in dimethylformamide.

Example 3

(polymer C)

699.26 parts of tetrahydrofuran were heated to the boil in a heatable reaction vessel having a capacity of 4000 parts by volume and equipped with a stirrer and reflux condenser. A mixture of 636.12 parts of methyl methacrylate, 636.12 parts of n-butyl methacrylate, 26.4 parts of mercaptoethanol and 3.2 parts of azobisisobutyronitrile was metered in over 2 hours. Stirring was carried out for 30 minutes, after which a solution of 5.28 parts of azobisisobutyronitrile in 61.26 parts of tetrahydrofuran was added in the course of a further 2 hours. After 2 hours, a mixture of 135.34 parts of tetrahydrofuran, 1.07 parts of hexamethylene diisocyanate, 129.31 parts of a trifunctional biuret of hexamethylene diisocyanate and 63.57 parts of biurets of hexamethylene diisocyanate which have a higher functionality of, on average, 4.8 was added in the course of 15 minutes. Stirring was carried out for 30 minutes, after which 0.64 part of dibutyltin dilaurate was added. After 1 hour, 61.3 parts of diethylenetriamine and 603.14 parts of tetrahydrofuran were added. The Fikentscher K value of the polymer was about 21, measured in 1% strength solution in dimethylformamide.

Example 4

(polymer D)

699.26 parts of tetrahydrofuran were heated to the boil in a heatable reaction vessel having a capacity of 4000 parts by volume and equipped with a stirrer and reflux condenser. A mixture of 636.12 parts of methyl methacrylate, 636.12 parts of n-butyl methacrylate, 26.4 parts of mercaptoethanol and 3.2 parts of azobisisobutyronitrile was metered in over 2 hours. Stirring was carried out for 30 minutes, after which a solution of 5.28 parts of azobisisobutyronitrile in 61.26 parts of tetrahydrofuran was added in the course of a further 2 hours. After 2 hours, a mixture of 135.34 parts of tetrahydrofuran, 1.07 parts of hexamethylene diisocyanate, 129.31 parts of a trifunctional biuret of hexamethylene diisocyanate and 63.57 parts of biurets of hexamethylene diisocyanate which have a higher functionality of, on average, 4.8 was added in the course of 15 minutes. Stirring was carried out for 30 minutes, after which 0.64 part of dibutyltin dilaurate was added. After 1 hour, 36.4 parts of ethylenediamine and 603.14 parts of tetrahydrofuran were added. The Fikentscher K value of the polymer was about 25, measured in 1% strength solution in dimethylformamide.

Example 5

(polymer E)

699.26 parts of tetrahydrofuran were heated to the boil in a heatable reaction vessel having a capacity of 4000 parts by volume and equipped with a stirrer and reflux condenser. A mixture of 636.12 parts of methyl methacrylate, 636.12 parts of n-butyl methacrylate, 26.4 parts of mercaptoethanol and 3.2 parts of azobisisobutyronitrile was metered in over 2 hours. Stirring was carried out for 30 minutes, after which a solution of 5.28 parts of azobisisobutyronitrile in 61.26 parts of tetrahydrofuran was added in the course of a further 2 hours. After 2 hours, a mixture of 135.34 parts of tetrahydrofuran, 1.07 parts of hexamethylene diisocyanate, 129.31 parts of a trifunctional biuret of hexamethylene diisocyanate and 63.57 parts of biurets of hexamethylene diisocyanate which have a higher functionality of, on average, 4.8 was added in the course of 15 minutes. Stirring was carried out for 30 minutes, after which 0.64 part of dibutyltin dilaurate was added. After 1 hour, 150.7 parts of a trifunctional polyamine having an average NH or $NH_2$ functionality of 6.5 and 603.14 parts of tetrahydrofuran were added. The Fikentscher K value of the polymer was about 26, measured in 1% strength solution in dimethylformamide.

Example 6

( polymer F ) 349.63 parts of tetrahydrofuran were heated to the boil in a heatable reaction vessel having a capacity of 2000 parts by volume and equipped with a stirrer and a reflux condenser. A mixture of 572.5 parts of methyl methacrylate, 63.6 parts of n-butyl methacrylate, 6.64 parts of mercaptoethanol and 1.6 parts of azobisisobutyronitrile was metered in over 2 hours. Stirring was carried out for 30 minutes, after which a solution of 2.64 parts of azobisisobutyronitrile in 30.63 parts of tetrahydrofuran was added in the course of a further 2 hours. After 2 hours, a mixture of 67.67 parts of tetrahydrofuran, 0.54 part of hexamethylene diisocyanate, 64.7 parts of a trifunctional biuret of hexamethylene diisocyanate and 30.8 parts of biurets having a higher functionality of, on average, 4.8 was added in the course of 15 minutes. Stirring was carried out for 30 minutes, after which 0.32 part of dibutyltin dilaurate was added. After 1 hour, 32.66 parts of diethylenetriamine and 301.57 parts of tetrahydrofuran were added. The Fikentscher K value of the polymer was about 24, measured in 1% strength solution in dimethylformamide.

In the examples which follow, parts are by weight.
Production of the magnetic recording media Example 7

A slurry (phase 1) of 616 g of tetrahydrofuran, 616 g of dioxane, 56 g of polymer B in the form of a 51.5% strength solution in tetrahydrofuran, 198 g of a low molecular weight, polyfunctional polyurethane synthesized from 1,6-hexanediol, trimethylolpropane, an OH-containing polyester of isophthalic acid, adipic acid and 1,4-butanediol and diethanolamine, having an OH number of about 40 mg KOH/g, as a 50% strength solution in tetrahydrofuran, 20.6 g of zinc oleate, 729 g of a ferromagneticchromium dioxide having a residual induction of 51 kA/m and an internal surface area of 28 $m^2/g$, 486 g of a cobalt-doped iron oxide having a residual induction of 54 kA/m and an internal surface area of 30 $m^2/g$, 15 g of carbon black and 5 g of alumina were dispersed for 120 hours in a steel ball mill having a capacity of 6 l and containing 8 kg of steel balls having a diameter of from 4 to 6 mm, on a roller stand. A further 198 g of the solution of the low molecular weight, polyfunctional polyurethane (see above), 277.5 g of a polyvinyl formal having a vinyl alcohol content of from 4 to 7% by weight, in the form of a 16.5% strength solution in 1:1 tetrahydrofuran/dioxane, 6 g of stearic acid, 6 g of commercial methyl stearate in the form of a 50% strength solution in tetrahydrofuran, 3 g of isobutyl stearate, 2.5 g of n-octyl stearate and 235 g of tetrahydrofuran and 530 g of dioxane (phase 2) were then added. The mixture was dispersed for a further 24 hours on the roller stand.

The prepared dispersion was separated from the balls, filtered under pressure, mixed with 1.7 g, based on 50 g of dispersion, of a 50% strength solution of triisocyanate of 3 mol of toluylene diisocyanate and 1 mol of trimethylolpropane in tetrahydrofuran while stirring, and immediately thereafter applied to a 15 μm thick polyethylene terephthalate film.

Example 8

(comparison)

The procedure was as in Example 7, except that 115.4 g of a 25% strength solution of a polyurea methacrylate in 2:1 tetrahydrofuran/dioxane were used instead of the 56 g of the 51.5% strength solution of polymer B. The additional solvent was compensated. The polyurea methacrylate was synthesized from an OH-containing polyacrylate having an average molecular weight of 5000 and a biuret polyisocyanate having an average functionality of 3.8, consisting of 0.5% by weight of diisocyanate and 60% by weight of triisocyanate, the remainder being a polyisocyanate having an average functionality of 4.8, and the residual NCO groups at the chain end being converted into urea groups by means of ammonia.

The following 2 examples were modifications of Examples 7 and 8 in a stirred ball mill having a trough volume of 1.2 l and containing ceramic balls having a diameter of 1 to 1.25 mm (degree of filling 70% by volume).

Example 9

The batch from Example 7 was multiplied by a factor of 2. Phase 1 was dispersed with a throughput of about 60 kg/h for about 12 hours by a circulation method. After the addition of phase 2, circulation was effected for a further 2 hours by the circulation method. Filtration of the prepared dispersion and addition of the crosslinking agent immediately before coating were carried out as in Example 7.

Example 10

(comparison)

The batch from Example 8 was multiplied by a factor of 2. The procedure was as in Example 9.

Example 11

The procedure was as in Example 7, except that 56 g of polymer A were used instead of 56 g of polymer B.

Example 12

The procedure was as in Example 7, except that 56 g of polymer C were used instead of 56 g of polymer B.

Example 13

The procedure was as in Example 7, except that 56 g of polymer D were used instead of 56 g of polymer B.

Example 14

(comparison)

The procedure was as in Example 8, except that, instead of the polyurea methacrylate used there, a polyurea methacrylate which had the same composition but in which the residual NCO groups at the chain end had been converted with aminoalkyltrialkoxysilanes was used.

The following tests were carried out on the dispersions prepared in this manner:

1) Gloss measurement

For this purpose, the particular dispersion was applied to a 24 μm thick polyethylene terephthalate film with a 40 μm thick knife coater at a feed rate of 1 m/s.

The gloss of a manual coat was determined with a Dr. Lange reflectometer at an angle of 60° C. The higher the gloss values, the better is the dispersing result.

The results are listed in Table 1:

TABLE 1

| Dispersion according to example | Gloss |
|---|---|
| 11 | 74 |
| 7 | 75 |
| 12 | 66 |
| 13 | 51 |
| 8 | 29 |
| 14 | — |

2) Eluate values

For this purpose, one dispersion each according to Example 7 and 8 were applied to polyethylene terephthalate film with the aid of a small laboratory coating apparatus to give a 3 μm thick layer. The dried layers were calendered using a laboratory calender (PU/steel) at 50 bar and 60° C. The coated, calendered film webs were slit into ½ inch wide tapes with a laboratory cutting apparatus. After aging for 10 days, elution was carried out according to DIN 38 414 and the eluate values were measured according to DIN 53 780 (Table 2).

Furthermore, one dispersion each according to Examples 9 and 10 were applied as a layer on polyethylene terephthalate films on a pilot-scale coating apparatus having a width of 125 mm. Passage through a magnetic field for orientation of the magnetic particles was followed by drying at 50 bar and 80° C. Calendering was then effected on a calender (PU/steel) of corresponding width at a nip pressure of 150 kg/cm and a steel roller temperature of 65° C. The calendered film webs were slit into ½ inch wide tapes with a pilot-scale cutting apparatus. After aging for 9 days, elution was carried out according to DIN 38 414 and the eluate values were measured according to DIN 53 780 (Table 2).

TABLE 2

| Eluate values of the tape samples according to DIN 53 780 | |
|---|---|
| | Concentration of Cr (VI) [mg/l] |
| Example 7 | 1.1 |
| Example 8 | 2.7 |
| Example 9 | 3.6 |
| Example 10 | 6.9 |

Owing to the gentler dispersing conditions in the ball mill, lower eluate values were obtained in the case of the dispersions prepared in this manner. In both cases, the use example gave better values than the comparative example with the polyurea methacrylate which carried unsubstituted terminal urea groups owing to the finish process with ammonia. The latter was used as a 25% strength solution in the comparative examples since, in contrast to the polyurea methacrylates according to the present invention, it showed a strong tendency to gelling when dissolved to an extent of 50%, in unfavorable cases even 25%, and was therefore difficult to process.

3) Magnetic values

After the films coated as described in the section Eluate values had been slit into ½ inch tapes, the electroacoustic and video data were determined as follows:

The following measurements were carried out on a VHS recorder from Victor Company of Japan, against the reference tape BRV 84 (0 dB):

Video output level (UF output level) (luminance signal): luminance signal of a 100% white image, measured with the UPSF interference voltage meter from Rohde Und Schwarz (>100 kHz).

Video signal/noise ratio (video S/N): ratio of the luminance signal of a 100% white image to the noise level, measured with the UPSF interference voltage meter from Rohde Und Schwarz (>100 kHz).

TABLE 3

| Dispersion according to Example | HF output level [dB] | S/N [dB] | FSM [dB] |
|---|---|---|---|
| 7 Measurement 1 | 2.6 | 3.3 | 0.8 |
| 7 Measurement 2 | 2.7 | 3.5 | 0.9 |
| 14 Measurement 1 | 2.0 | 2.87 | 0.4 |
| 14 Measurement 2 | 2.1 | | −0.3' |

We claim:

1. A magnetic recording medium, consisting of a nonmagnetic substrate and at least one magnetizable layer applied thereon, said magnetizable layer containing a magnetic material dispersed in a binder mixture which contains at least one hydroxyl-containing polyureaurethane and one polyurethaneurea (meth)acrylate, wherein the polyurethaneurea (meth)acrylate is obtained by reacting a poly-(meth)acrylate having up to 2 terminal OH groups per mol and a number average molecular weight of from 200 to 50,000 with a mixture of aliphatic polyisocyanates having an average functionality of from 3.0 to 6.0 NCO groups per mol, consisting of from 0.1 to 10% by weight of a disiocyanate
from 30 to 80% by weight of a triisocyanate and
from 20 to 60% by weight of an isocyanate having a functionality of from 4 to 10, with the proviso that from 1.2 to 3.0 NCO groups react per OH group and the remaining NCO groups are converted into substitute terminal urea groups by reacting with a polyfunctional amine having amino functions or with a mixture of different polyfunctional amines having amino functions.

2. A magnetic recording medium as defined in claim 1, wherein the mixture of aliphatic polyisocyanates has an average functionality of from 3.5 to 5.0 NCO groups per mol, with the proviso that from 1.5 to 2.5 NCO groups react per OH group.

3. A magnetic recording medium as defined in claim 1, wherein the ratio of the polyfunctional amine or of the polyurethaneurea (meth)acrylate containing a mixture of different polyfunctional amines to the polyureaurethane is from 0.05 to 1.

4. A magnetic recording medium as defined in claim 1, wherein the polyfunctional amines forming terminal groups contain at least 3 amino functions.

5. A magnetic recording medium as defined in claim 1, wherein the polyfunctional amines forming terminal groups contain at least 3 amino functions, including at least two primary amino functions.

6. A magnetic recording medium as defined in claim 1, wherein the amines forming terminal groups have a nitrogen content of from 22 to 56% by weight.

7. A magnetic recording medium as defined in claim 6, wherein the amines forming terminal groups have a nitrogen content of from 30 to 40% by weight.

8. A magnetic recording medium as defined in claim 1, wherein the polyurethane has a number average molecular weight of from 3000 to 15,000.

* * * * *